US008314735B2

(12) United States Patent
Park

(10) Patent No.: US 8,314,735 B2
(45) Date of Patent: Nov. 20, 2012

(54) SATELLITE TRACKING ANTENNA SYSTEM WITH IMPROVED TRACKING CHARACTERISTICS AND OPERATING METHOD THEREOF

(75) Inventor: Chan Goo Park, Daejeon (KR)

(73) Assignee: Wiworld Co., Ltd., Daejeon (KR)

( * ) Notice: Subject to any disclaimer, the term of this patent is extended or adjusted under 35 U.S.C. 154(b) by 279 days.

(21) Appl. No.: 12/776,339

(22) Filed: May 7, 2010

(65) Prior Publication Data

US 2010/0283696 A1 Nov. 11, 2010

Related U.S. Application Data

(63) Continuation of application No. PCT/KR2007/005616, filed on Nov. 8, 2007.

(30) Foreign Application Priority Data

Nov. 7, 2007 (KR) ........................ 10-2007-0112967

(51) Int. Cl.
*H01Q 3/00* (2006.01)
*G01S 19/24* (2010.01)

(52) U.S. Cl. .................................. 342/359; 342/357.63

(58) Field of Classification Search .................... 342/74, 342/75, 77, 79, 359, 357.63, 357.71; 343/760, 343/766
See application file for complete search history.

(56) References Cited

U.S. PATENT DOCUMENTS

| | | | | |
|---|---|---|---|---|
| 5,223,845 | A * | 6/1993 | Eguchi | 342/359 |
| 5,351,060 | A | 9/1994 | Bayne | |
| 5,583,514 | A | 12/1996 | Fulop | |
| 6,441,779 | B1 | 8/2002 | Bennett et al. | |
| 2002/0180634 | A1 | 12/2002 | Carson | |

FOREIGN PATENT DOCUMENTS

| | | | |
|---|---|---|---|
| JP | 2001-304879 | | 10/2001 |
| KR | 10-20040103002 | A | 12/2004 |
| KR | 10-20050011119 | A | 1/2005 |
| KR | 10-20070061103 | A | 6/2007 |

OTHER PUBLICATIONS

Office Action Communication for U.S. Appl. No. 12/398,698 (related application), dated Jul. 21, 2011.
International Search Report and Written Opinion issued in PCT/KR2007/005616 dated Jul. 31, 2008.

* cited by examiner

*Primary Examiner* — Dao Phan
(74) *Attorney, Agent, or Firm* — Knobbe, Martens, Olson & Bear, LLP

(57) ABSTRACT

A satellite tracking antenna system with improved tracking characteristics and operating method thereof are disclosed. The system independently controls an elevation angle and an azimuth angle of an antenna according to the movement of a vehicle, controls the elevation angle of the antenna only when a satellite elevation-angle variation is equal to or higher than a reference value, so that it can improve the tracking speed and performance of the satellite. The system includes an antenna unit, a GPS receiver, an azimuth-angle gyro-sensor, a control board, a motor unit. The control board includes an elevation-angle controller and a main controller. The motor unit includes an elevation-angle motor and an azimuth-angle motor.

6 Claims, 5 Drawing Sheets

SATELLITE TRACKING ANTENNA SYSTEM WITH IMPROVED TRACKING CHARACTERISTICS AND OPERATING METHOD THEREOF

RELATED APPLICATIONS

This application is a continuation application, and claims the benefit under 35 U.S.C. §§120 and 365, of PCT Application No. PCT/KR2007/005616, filed on Nov. 8, 2007, which is hereby incorporated by reference in its entirety. PCT/KR2007/005616 claimed the benefit of Korean Patent Application No. 10-2007-0112967 filed Nov. 7, 2007, which is hereby incorporated by reference in its entirety.

BACKGROUND

1. Field

The present invention relates to a satellite tracking antenna system with improved tracking characteristics, which independently controls an elevation angle and an azimuth angle of an antenna according to the movement of a vehicle, controls the elevation angle of the antenna only when a satellite elevation-angle variation is equal to or higher than a reference value, so that it can improve the tracking speed and performance of the satellite, and a method for controlling the satellite tracking antenna system.

2. Description of the Related Technology

Generally, the conventional satellite tracking antenna system has been installed in a moving vehicle, so that it must continuously track the satellite location according to the movement of the vehicle, and must rotate the direction of the antenna.

SUMMARY OF CERTAIN INVENTIVE ASPECTS

Embodiments of the present invention have been made in view of the problems with conventional satellite antenna tracking systems, and it is an object of the present invention to provide a satellite tracking antenna system with improved tracking characteristics, which captures/tracks an elevation angle of a satellite using a GPS, controls an elevation angle of an antenna only when the satellite elevation-angle variation is equal to or higher than a reference value, and captures/tracks an azimuth angle of the satellite separately from the above-mentioned elevation-angle control process so as to control the azimuth angle of the antenna, thereby quickly and correctly perform the satellite tracking function, and a method for controlling the satellite tracking antenna system.

In accordance with one embodiment of the present invention, the above and other objects can be accomplished by the provision of a satellite tracking antenna system comprising: an antenna unit for receiving a satellite signal from a satellite; a GPS receiver for receiving a GPS signal from a GPS satellite; an azimuth-angle gyro-sensor for detecting the movement of an azimuth angle of a vehicle; a control board including: an elevation-angle controller for analyzing the GPS signal received from the GPS receiver, calculating an initial elevation-angle location of the satellite, and capturing the calculated elevation angle location, and a main controller for analyzing the satellite signal received from the antenna unit, capturing the azimuth angle of the satellite, analyzing the azimuth-angle movement of the vehicle detected by the azimuth-angle gyro-sensor, and tracking the azimuth angle of the satellite; and a motor unit including: an elevation-angle motor for rotating an elevation angle of the antenna unit toward an elevation-angle directional location upon receiving a control signal from the elevation-angle controller, and an azimuth-angle motor for rotating the azimuth angle of the antenna unit toward the azimuth-angle directional location of the satellite upon receiving a control signal from the main controller.

In one aspect, the elevation-angle controller tracks a satellite elevation-angle variation caused by the movement of the vehicle, controls the elevation-angle motor if the elevation angle variation is equal to or higher than a reference value, and rotates the elevation angle of the antenna unit toward a changed satellite elevation angle directional location.

In one aspect, the elevation-angle controller stores the changed satellite elevation-angle information in a memory, determines whether the GPS signal is not received when the initial elevation-angle of the satellite is captured, and determines the elevation angle stored in the memory to be a directional elevation angle of the antenna unit.

Also, in one aspect, the elevation-angle controller transmits an elevation-angle change signal to the main controller when the elevation angle of the antenna unit is changed to another angle.

In still another aspect, the main controller receives the elevation-angle change signal caused by the capturing of the initial elevation angle of the satellite from the elevation-angle controller, and captures/tracks the azimuth angle of the satellite.

In embodiment of the present invention, there is provided a satellite tracking method for use in a satellite tracking antenna system comprising: a) analyzing a GPS signal received from a GPS satellite, calculating/capturing an initial elevation angle of the satellite, and rotating an elevation angle of an antenna unit toward an initial elevation-angle directional location of the satellite; b) analyzing a satellite signal received from the antenna unit, capturing the azimuth angle of the satellite, analyzing the azimuth-angle movement of the vehicle detected by an azimuth-angle gyro-sensor, continuously tracking the azimuth angle of the satellite, and rotating an azimuth angle of the antenna unit toward an azimuth-angle directional location of the satellite; and c) tracking a satellite elevation-angle variation caused by the movement of the vehicle, controlling an elevation-angle motor if the elevation angle variation is equal to or higher than a reference value, and rotating the elevation angle of the antenna unit toward a changed satellite elevation-angle directional location.

In one aspect, the method further can include storing the changed satellite elevation-angle information in a memory if a directional elevation angle of the antenna unit is changed to another angle, determining whether the GPS signal is not received when the initial elevation-angle of the satellite is captured, and determining the elevation angle stored in the memory to be the directional elevation angle of the antenna unit if it is determined that the GPS signal has not been received when the initial elevation-angle of the satellite is captured.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF CERTAIN INVENTIVE EMBODIMENTS

Figure 1:
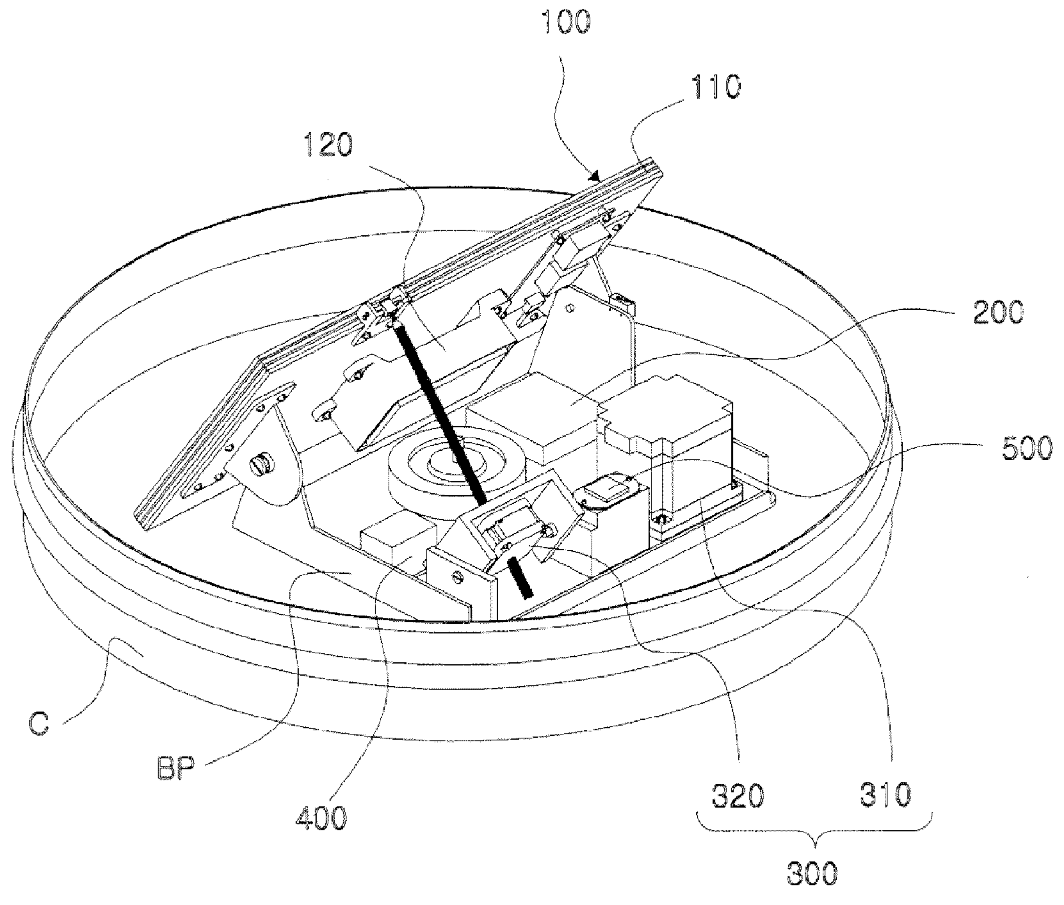
FIG. 1 is a perspective view illustrating an example of a satellite tracking antenna system according to the present invention.

Now some preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Generally, satellite tracking antenna systems can be classified into a 1-axis satellite tracking antenna systems and a 2-axis satellite tracking antenna systems. The 1-axis satellite tracking antenna system fixes the directional elevation angle of the antenna, and tracks only the azimuth angle. The 2-axis satellite tracking antenna system tracks the elevation angle and the azimuth angle of the antenna.

The 1-axis satellite tracking antenna system has a fixed satellite directional elevation-angle of the antenna. Therefore, in the case where the reception range of the satellite signal becomes wider because the vehicle moves far away, and the elevation angle of the satellite is changed to another angle, the conventional satellite tracking antenna system cannot easily receive the satellite signal from the satellite.

Recently, the 2-axis satellite tracking antenna system has been widely used. This 2-axis satellite tracking antenna system can track both the elevation angle and the azimuth angle of the satellite, so that it can receive the satellite signal in a wider area. However, the 2-axis satellite tracking antenna system must track the elevation angle and the azimuth angle, so that its satellite tracking algorithm is more complicated than the 1-axis satellite tracking antenna system, resulting in deterioration of the tracking speed and the performance. In order to solve the above-mentioned deterioration of the tracking speed and the performance, there is proposed a new method for tracking the satellite location using the gyro-sensor such as a gyroscope.

However, although the gyro-sensor is used, the 2-axis satellite tracking antenna system must adjust all of the elevation angle and the azimuth angle to track the satellite location, so that an initial capturing time for searching for the satellite location becomes longer. If the 2-axis satellite tracking antenna system passes a blind area in which the satellite signal is blocked, it requires a long period of time to re-track the satellite location.

Embodiments of the present invention have been made in view of the problems with conventional satellite antenna tracking systems, and embodiments of the present invention provide a satellite tracking antenna system with improved tracking characteristics.

Figure 2:
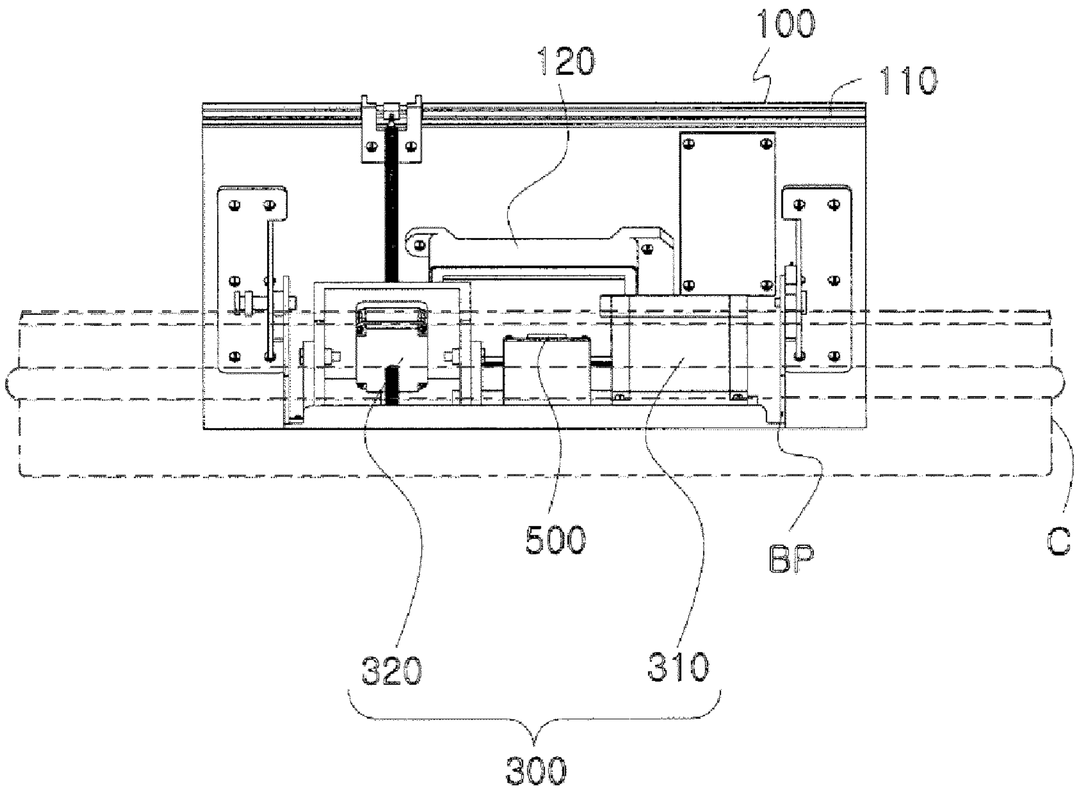
FIG. 2 is a front view illustrating an example of a satellite tracking antenna system according to the present invention.
Figure 3:
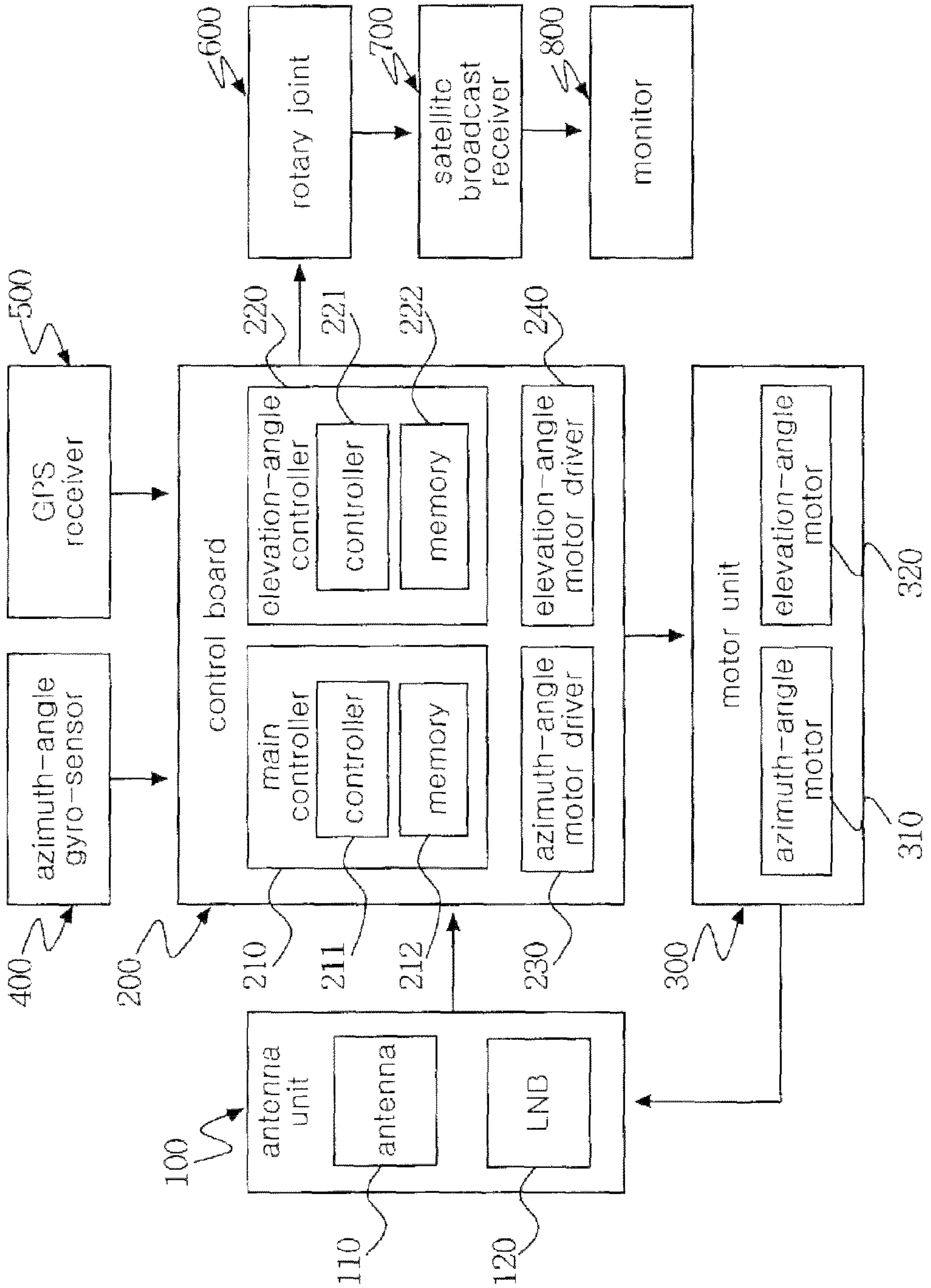
FIG. 3 is a block diagram illustrating an example of satellite tracking antenna system according to the present invention.

FIG. 1 is a perspective view illustrating an example of a satellite tracking antenna system according to the present invention. FIG. 2 is a front view illustrating an example of a satellite tracking antenna system according to the present invention. FIG. 3 is an example of a block diagram illustrating a satellite tracking antenna system according to the present invention.

Referring to FIGS. 1 to 3, the satellite tracking antenna system according to the present invention includes: an antenna unit 100 for receiving a satellite signal; an azimuth angle gyro-sensor 400 for detecting the movement of an azimuth angle of a vehicle; a GPS receiver 500 for receiving a GPS signal from a GPS (Global Positioning System) satellite; a control board 200 for analyzing signals received in the antenna unit 100, the azimuth-angle gyro-sensor 400, and the GPS receiver 500, and capturing/tracking a location of the satellite; a motor unit 300 for rotating the antenna unit 100 toward a directional location of the satellite upon receiving a control signal from the control board 200; and a rotary joint 600 for transmitting the satellite signal received from the antenna unit 100 to the satellite broadcast receiver 700.

The above-mentioned constituent components are installed on a base plate (BP) contained in the case C. This base plate (BP) is installed in the case C so that it can be horizontally rotated on the basis of the rotary joint 600. A cap (not shown) is coupled to the top of the case C, so that it can protect the above-mentioned components.

The antenna unit 100 includes an antenna 110 for receiving a satellite signal from the satellite, and a LNB (Low Noise Block down converter) 120 for converting the received satellite signal into an intermediate-frequency (IF) satellite signal, and transmitting the IF satellite signal to the control board 200. According to this embodiment of the present invention, the antenna 110 is composed of a flat-type waveguide slot arrangement antenna.

The azimuth-angle gyro-sensor 400 is used to track the variation of the satellite azimuth-angle caused by the movement of a vehicle. The azimuth angle gyro-sensor detects an azimuth-angle angular-velocity caused by the vehicle movement, and transmits the detected angular velocity to the control board 200.

The GPS receiver 500 is used to capture/track the elevation angle of the satellite. This GPS receiver 500 receives the GPS signal from the GPS satellite, and transmits the received GPS signal to the control board 200.

The control board 200 includes a main controller 210, an elevation-angle controller 220, an azimuth-angle motor driver 230, and an elevation-angle motor driver 240. The main controller 210 analyzes the strength of the received satellite signal, captures the azimuth angle of the satellite, analyzes the movement information of the vehicle's azimuth-angle detected by the azimuth angle gyro-sensor 400, and continuously tracks the azimuth angle of the satellite. The elevation-angle controller 220 analyzes the GPS signal received from the GP receiver 500, and calculates/captures/tracks the elevation angle of the satellite according to the analyzed result. The azimuth-angle motor driver 230 drives the azimuth angle motor 310 of the motor 300 upon receiving a control signal from the main controller 210. The elevation-angle motor driver 240 drives the elevation angle motor 320 of the motor unit 300 upon receiving a control signal from the elevation-angle controller 220.

The main controller 210 includes a memory 212 and a controller 211. The memory 212 stores an azimuth-angle tracking program, which captures the initial azimuth angle of the satellite and continuously tracks the satellite azimuth-angle according to the movement of the vehicle. The controller 211 executes the azimuth angle tracking program stored in the memory 212 to capture/track the azimuth angle of the satellite, controls the azimuth-angle motor driver 230 so as to allow the antenna unit 100 to face the azimuth angle of the satellite, and drives the azimuth-angle motor 310.

The elevation-angle controller 220 includes a memory 222 and a controller 221. The memory 222 stores an elevation-angle tracking program, which captures/tracks the elevation angle of the satellite. The controller 221 executes the elevation-angle tracking program stored in the memory 222 to capture/track the elevation angle of the satellite, controls the elevation-angle motor driver 240 so as to allow the antenna unit 100 to face the elevation angle of the satellite, and drives the elevation-angle motor 320.

The memory 222 includes the satellite elevation-angle information which has been calculated/captured by the controller 221. The main controller 210 and the elevation-angle controller 220 are driven independent of each other, so that they can control the azimuth angle and the elevation angle of the antenna unit 100.

The motor unit 300 includes an azimuth-angle motor 310 and an elevation-angle motor 320. The azimuth-angle motor 310 is driven by the azimuth-angle motor driver 230 of the control board 200, and rotates the antenna unit 100 toward the azimuth angle. The elevation-angle motor 320 is driven by the elevation-angle motor driver 240, and rotates the antenna unit 100 toward the elevation angle. According to this embodiment of the present invention, the above-mentioned elevation-angle motor 320 is composed of a linear motor.

The main controller 210 of the control board 200 transmits the satellite signal received via the antenna unit 100 to the rotary joint 600. The rotary joint 600 transmits the satellite signal received from the control board 200 to the satellite broadcast receiver 700. The satellite signal transmitted to the satellite broadcast receiver 700 is displayed on the monitor 800. Also, the above-mentioned rotary joint 600 receives a power-supply signal from an external part, and transmits the power-supply signal to the above-mentioned components.

Figure 4:
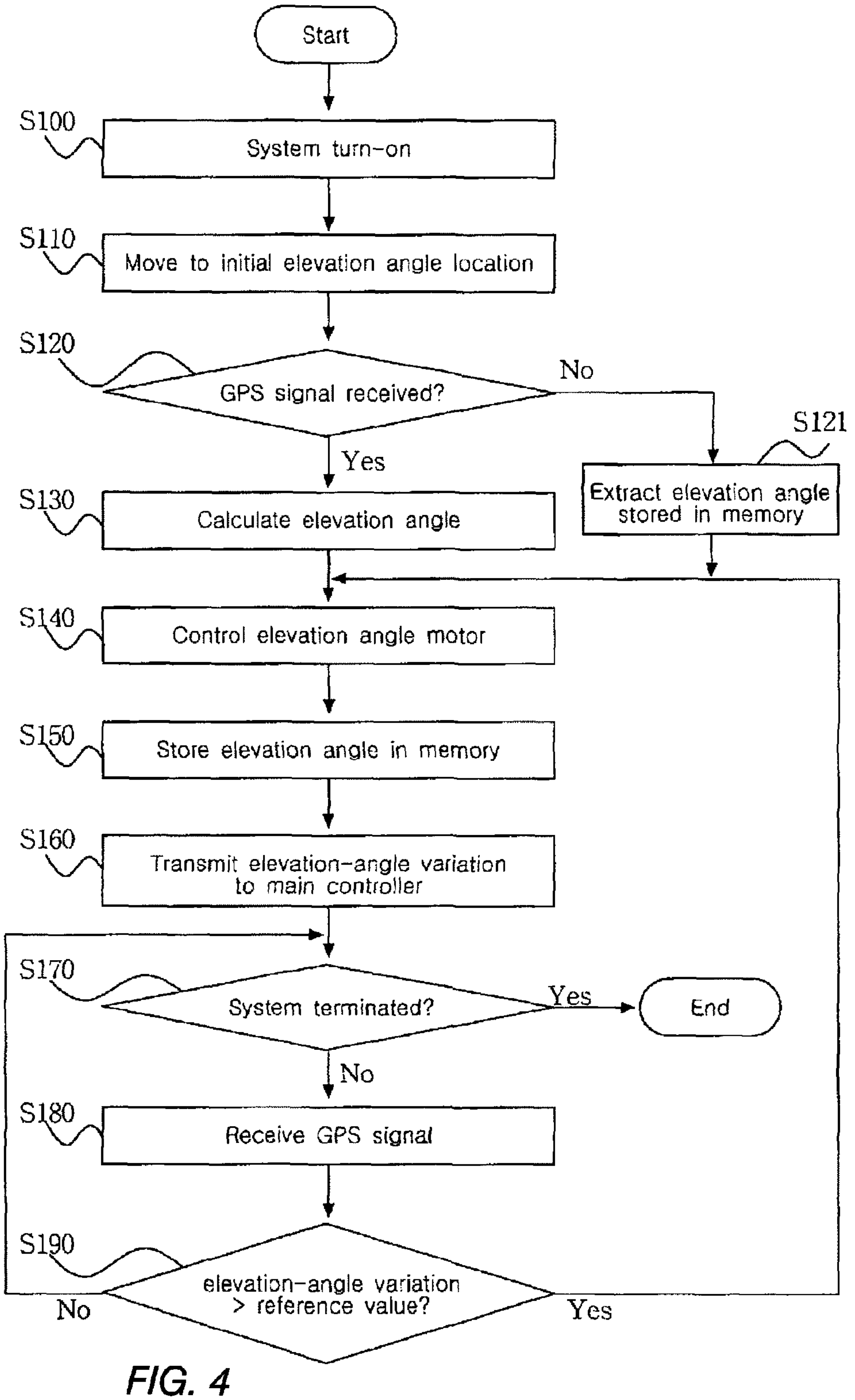
FIG. 4 is a flow chart illustrating an example of a method for controlling an elevation angle of an antenna according to the present invention.
Figure 5:
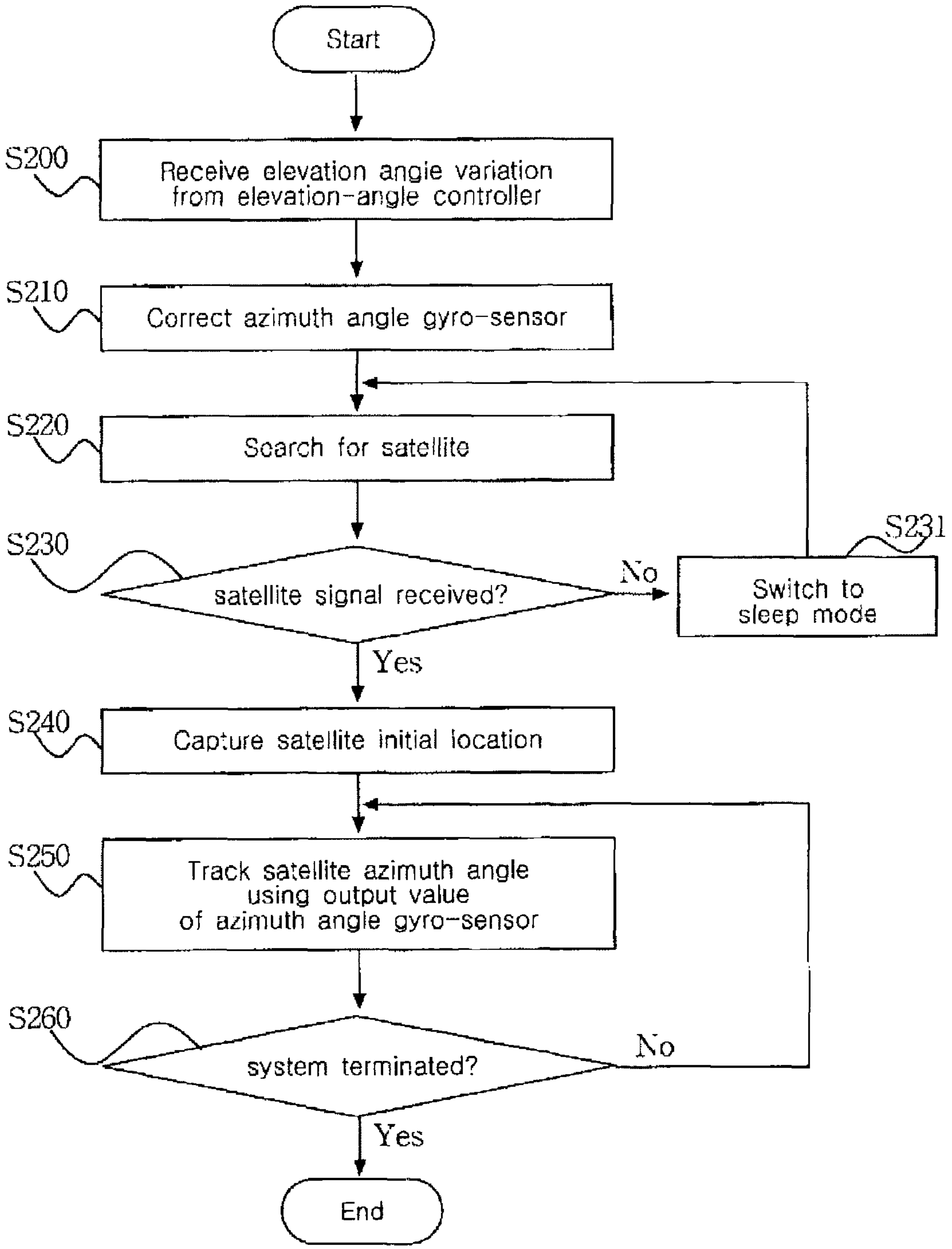
FIG. 5 is a flow chart illustrating an example of a method for controlling an azimuth angle of an antenna according to the present invention.

Operations of the above-mentioned satellite tracking antenna system will hereinafter be described with reference to FIGS. 4 and 5.

It should be noted that the satellite tracking antenna system controls the elevation angle and the azimuth angle of the antenna independent of each other. FIG. 4 is a flow chart illustrating a method for controlling an elevation angle of an antenna according to the present invention. FIG. 5 is a flow chart illustrating a method for controlling an azimuth angle of an antenna according to the present invention.

A method for controlling a directional elevation angle of the antenna unit 100 will hereinafter be described with reference to FIG. 4.

Steps S100 and S110

If the satellite tracking antenna system is turned on so that a power-supply signal is applied to the satellite tracking antenna system at step S100, the elevation-angle controller 220 of the control board 200 controls the elevation-angle motor 320 using the elevation-angle motor driver 240, so that it moves the directional elevation angle of the antenna unit 110 to an initial location at step S110.

Step S120

If the elevation angle of the antenna unit 100 is initialized, the GPS receiver 500 receives the GPS signal from the GPS satellite, and transmits the received GPS signal to the elevation-angle controller 220.

Steps S130 and S121

The elevation-angle controller 220 analyzes the GPS signal of the GPS receiver 500, and calculates the elevation angle of the satellite at step S130. Since the elevation angle of the satellite which desires to receive the signal is fixed, the elevation-angle controller 220 can calculate the elevation angle of the satellite on the condition that the current location of the vehicle is recognized via the GPS signal. If the GPS receiver 500 does not normally receive the GPS signal, the elevation-angle controller 220 extracts conventional setup elevation angle information stored in the memory 222 at step S121.

Steps S140 and S150

The elevation-angle controller 220 controls the elevation-angle motor 320 so that it rotates the elevation angle of the antenna unit 100 toward the elevation-angle location having been calculated or extracted at step S140, and stores the established elevation-angle information in the memory 222 at step S150.

Step S160

If the elevation angle of the antenna unit 100 is established, the elevation-angle controller 220 transmits an elevation-angle change signal, indicating that the elevation angle of the antenna unit 100 has been changed to another angle, to the main controller 210.

Steps S170 and S180

If the system operation is not terminated at step S170, the GPS receiver 500 receives the GPS signal, and transmits the received GPS signal to the elevation-angle controller 220. The elevation-angle controller 220 analyzes the GPS signal, and calculates the elevation angle of the azimuth angle at step S180.

Step S190

The elevation-angle controller 220 controls the calculated elevation angle and a variation of the elevation angle currently aimed by the antenna unit 100, and determines whether a variation value of the elevation angle is higher than a reference value. If the variation value of the elevation-angle is higher than the reference value, the elevation-angle controller 220 controls the elevation-angle motor 320 at step S140, and stores the elevation angle information in the memory 222 at step S150.

According to the embodiment of the present invention, the elevation-angle controller 220 has been designed to change a current elevation angle to another elevation angle only when the variation value of the elevation angle is higher than the reference value, because the reception of the satellite signal is less affected by a minute or little variation of the elevation angle. If the elevation angle of the antenna unit 100 is continuously changed to another angle according to the minute variation of the elevation angle, this continuously-changing operation has a negative influence upon the system processing speed, etc. According to the embodiment of the present invention, the reference value associated with the elevation-angle variation may be set to about 4° in consideration of the reception rate and the processing speed of the satellite signal, etc.

In the meantime, a method for controlling the azimuth angle of the antenna unit 100 will hereinafter be described with reference to FIG. 5.

Step S200

If the system is turned on, the main controller 210 receives an elevation-angle change signal, indicating that the elevation angle of the antenna unit 100 has been changed to another angle, from the elevation-angle controller 220.

Step S210

If the elevation-angle change signal is received from the elevation-angle controller 220, the main controller 210 performs calibration to establish an output reference value of the azimuth-angle gyro-sensor 400.

Step S220

After the correction of the azimuth angle gyro-sensor 400 is performed, the main controller 210 drives the azimuth angle motor 310 to rotate the antenna unit 100, and searches for an initial location of the satellite.

Steps S230 and S231

If the satellite signal is not received while the antenna unit 100 rotates by 360° at step S230, the main controller 210 determines that the vehicle is in a blind area in which the vehicle is unable to receive the satellite signal, so that it switches the satellite tracking mode to the sleep mode and maintains a standby status in the sleep mode at step S231. If a predetermined period of time has elapsed, the main controller 210 returns to step S220.

Step S240

If a specific location, at which the satellite signal is received, is detected, the main controller 210 analyzes the strength of the received satellite signal, and captures the initial azimuth-angle location of the satellite.

Step S250

If the initial azimuth-angle location of the satellite is captured, the main controller 210 analyzes the azimuth-angle movement information of the vehicle detected by the azimuth angle gyro-sensor 400, and tracks the satellite azimuth-angle changed according to the movement of the vehicle, so that it can control the directional azimuth angle of the antenna unit 100 using the azimuth-angle motor 310. The above-mentioned satellite azimuth-angle tracking process of the main controller 210 is performed separately from the satellite elevation-angle control process of the elevation-angle controller 220.

Step S260

The above-mentioned process for capturing/tracking the azimuth angle of the satellite is repeatedly performed until the system operation is terminated.

Although the present invention has disclosed that the main controller 210 captures/tracks the azimuth angle after receiving the initial elevation-angle variation signal from the elevation-angle controller 220, it should be noted that this main controller 210 can also capture/track the azimuth angle on the condition that the system is turned on, irrespective of the reception of the elevation-angle variation signal.

As described above, the elevation-angle controller 220 according to the present invention analyzes the GPS signal to calculate the elevation angle of the satellite. The elevation-angle controller 220 drives the elevation-angle motor 320 so that it allows the antenna unit 100 to face the elevation angle of the satellite. The main controller 210 analyzes the strength of the received satellite signal, captures an initial azimuth-angle location of the satellite, analyzes the output value of the azimuth-angle gyro-sensor 400, and continuously tracks the azimuth angle of the satellite according to the analyzed result. The elevation-angle controller 220 drives the azimuth-angle motor 310, and allows the antenna unit 100 to face the azimuth angle of the satellite.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

According to at least one embodiment, as apparent from the above description, the satellite tracking antenna system according to the present invention allows the main controller and the elevation-angle controller of the control board to control the elevation angle and the azimuth angle of the antenna independent of each other, so that it can quickly and stably track the satellite.

The elevation-angle controller according to the present invention analyzes the GPS signal, calculates the elevation angle of the satellite, controls the elevation angle of the antenna only when the variation of the satellite elevation-angle is equal to or higher than a reference value, and prevents the elevation angle from being frequently controlled by the minute variation of the elevation angle, so that it increases the satellite tracking speed and prevents the occurrence of unnecessary power consumption. Also, the elevation-angle controller stores the changed elevation angle of the satellite in the memory, and quickly controls the elevation angle of the antenna using previous satellite elevation-angle information stored in the memory even when it cannot receive the GPS signal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A satellite tracking antenna system comprising:

an antenna unit for receiving a satellite signal from a satellite;

a GPS receiver for receiving a GPS signal from a GPS satellite;

an azimuth-angle gyro-sensor for detecting the movement of an azimuth angle of a vehicle;

a control board including:

an elevation-angle controller for analyzing the GPS signal received from the GPS receiver, calculating an initial elevation-angle location of the satellite, and capturing the calculated elevation angle location, and a main controller for analyzing the satellite signal received from the antenna unit, capturing the azimuth angle of the satellite, analyzing the azimuth-angle movement of the vehicle detected by the azimuth-angle gyro-sensor, and tracking the azimuth angle of the satellite; and a motor unit including:

an elevation-angle motor for rotating an elevation angle of the antenna unit toward an elevation-angle directional location upon receiving a control signal from the elevation-angle controller, and an azimuth-angle motor for rotating the azimuth angle of the antenna unit toward the azimuth-angle directional location of the satellite upon receiving a control signal from the main controller, wherein the elevation-angle controller tracks a satellite elevation-angle variation caused by the movement of the vehicle, controls the elevation-angle motor if the elevation angle variation is equal to or higher than a reference value, and rotates the elevation angle of the antenna unit toward a changed satellite elevation angle directional location.

2. The satellite tracking antenna system according to claim 1, wherein the elevation-angle controller stores the changed satellite elevation-angle information in a memory, determines whether the GPS signal is not received when the initial elevation-angle of the satellite is captured, and determines the elevation angle stored in the memory to be a directional elevation angle of the antenna unit.

3. The satellite tracking antenna system according to claim 1, wherein the elevation-angle controller transmits an elevation-angle change signal to the main controller when the elevation angle of the antenna unit is changed to another angle.

4. The satellite tracking antenna system according to claim 1, wherein the main controller receives the elevation-angle change signal caused by the capturing of the initial elevation angle of the satellite from the elevation-angle controller, and captures/tracks the azimuth angle of the satellite.

5. A satellite tracking method for use in a satellite tracking antenna system comprising:

a) analyzing a GPS signal received from a GPS satellite, calculating/capturing an initial elevation angle of the satellite, and rotating an elevation angle of an antenna unit toward an initial elevation-angle directional location of the satellite;

b) analyzing a satellite signal received from the antenna unit, capturing the azimuth angle of the satellite, analyzing the azimuth-angle movement of the vehicle detected by an azimuth-angle gyro-sensor, continuously tracking the azimuth angle of the satellite, and rotating an azimuth angle of the antenna unit toward an azimuth-angle directional location of the satellite; and c) tracking a satellite elevation-angle variation caused by the movement of the vehicle, controlling an elevation-angle motor if an elevation angle variation is equal to or higher than a reference value, and rotating the elevation angle of the antenna unit toward a changed satellite elevation-angle directional location.

6. The satellite tracking method according to claim 5, further comprising:

storing the changed satellite elevation-angle information in a memory if a directional elevation angle of the antenna unit is changed to another angle, determining whether the GPS signal is not received when the initial elevation-angle of the satellite is captured, and determining the elevation angle stored in the memory to be the directional elevation angle of the antenna unit if it is determined that the GPS signal has not been received when the initial elevation-angle of the satellite is captured.

* * * * *